Sept. 7, 1965 D. G. FAWKES 3,204,928

BUTTERFLY VALVE HAVING ADJUSTABLE MEANS FOR THE VALVE SEAT-ENGAGING SURFACE

Filed Feb. 4, 1963 2 Sheets-Sheet 1

Inventor:
Donald G. Fawkes
By: Hofgren, Wegner, Allen, Stellman & McCord
Attorneys United States Patent Office 3,204,928

Patented Sept. 7, 1965

3,204,928

BUTTERFLY VALVE HAVING ADJUSTABLE MEANS FOR THE VALVE SEAT-ENGAGING SURFACE

Donald G. Fawkes, Chicago, Ill., assignor to Henry Pratt Company, a corporation of Illinois Filed Feb. 4, 1963, Ser. No. 258,371
4 Claims. (Cl. 251—307)

This invention relates to butterfly valves and more particularly to a structure for closing such valves.

The valve of this invention comprises a valve housing having a generally circular cylindrical cavity providing a fluid passage through the housing, a valve seat formed in the housing and a closure member pivotally mounted in the housing for movement approximately 90° between valve open and valve closed positions. The valve is useful in liquid and pneumatic service and particularly useful in vacuum conditions requiring tight shutoff. The valve may be manufactured in many sizes ranging through the popularly used piping sizes in water service, manufacturing plants, test facilities and the like. The valve provides a novel sealing structure, adjustable in nature to insure a good seal and one in which closing movement brings the mating parts toward tighter sealing engagement.

The principal object of this invention is to provide a new and improved butterfly valve closing structure.

Another object of this invention is to provide a butterfly valve in which there is a continuous uninterrupted seal between the closure and the body of the valve so shaped and arranged that the mating portions may be relatively adjusted locally to insure a seal between the parts.

A still further object is to provide a novel butterfly valve in which the mating parts of the closure and valve body are so arranged that the closure is in effect lifted out of the body of the valve upon movement toward opening from fully closed position and in closed position may be locally adjusted relative to the body of the valve insuring a fluid tight seal.

Another object is to provide a butterfly valve having a closure structure in which means are provided for selectively increasing and decreasing mechanically applied pressure on the closing member for the purpose of providing a means for adjusting mating parts providing a seal between the closure and the valve body.

Figure 1:
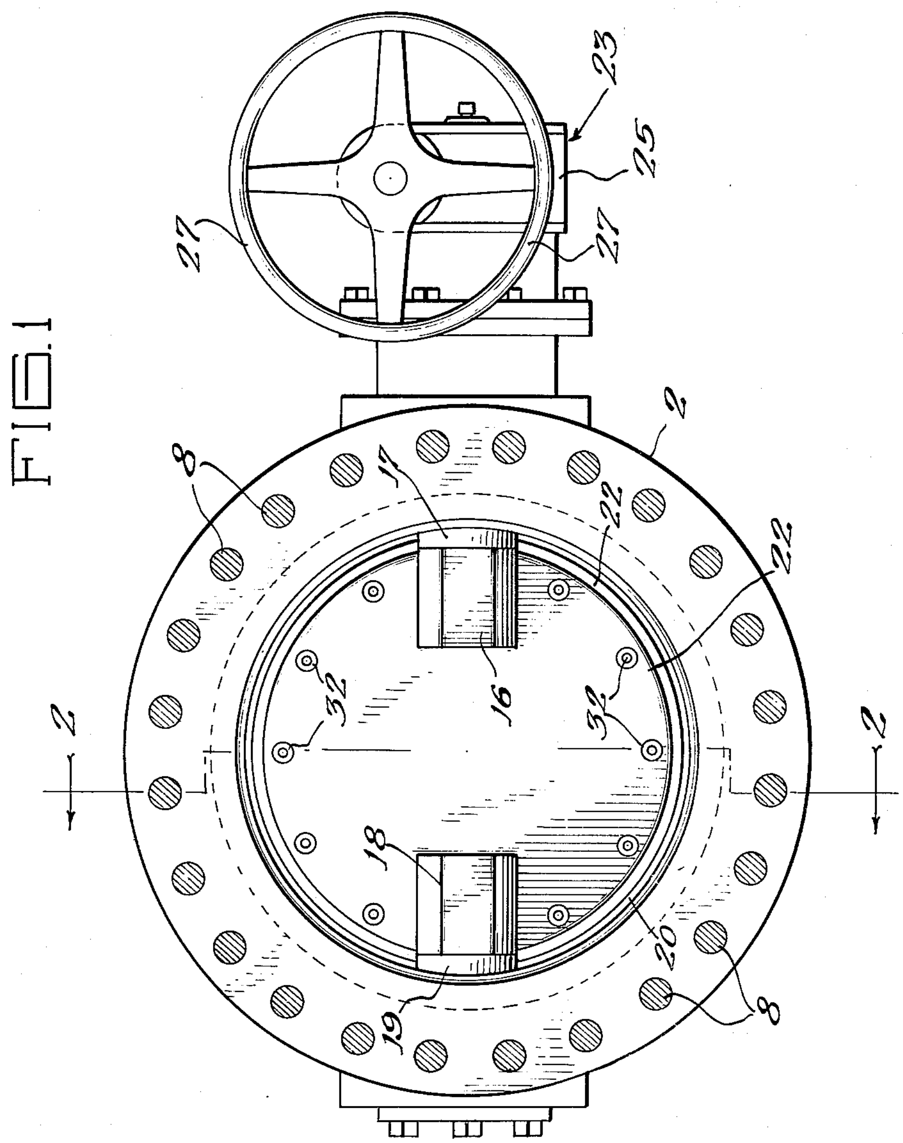
Figure 2:
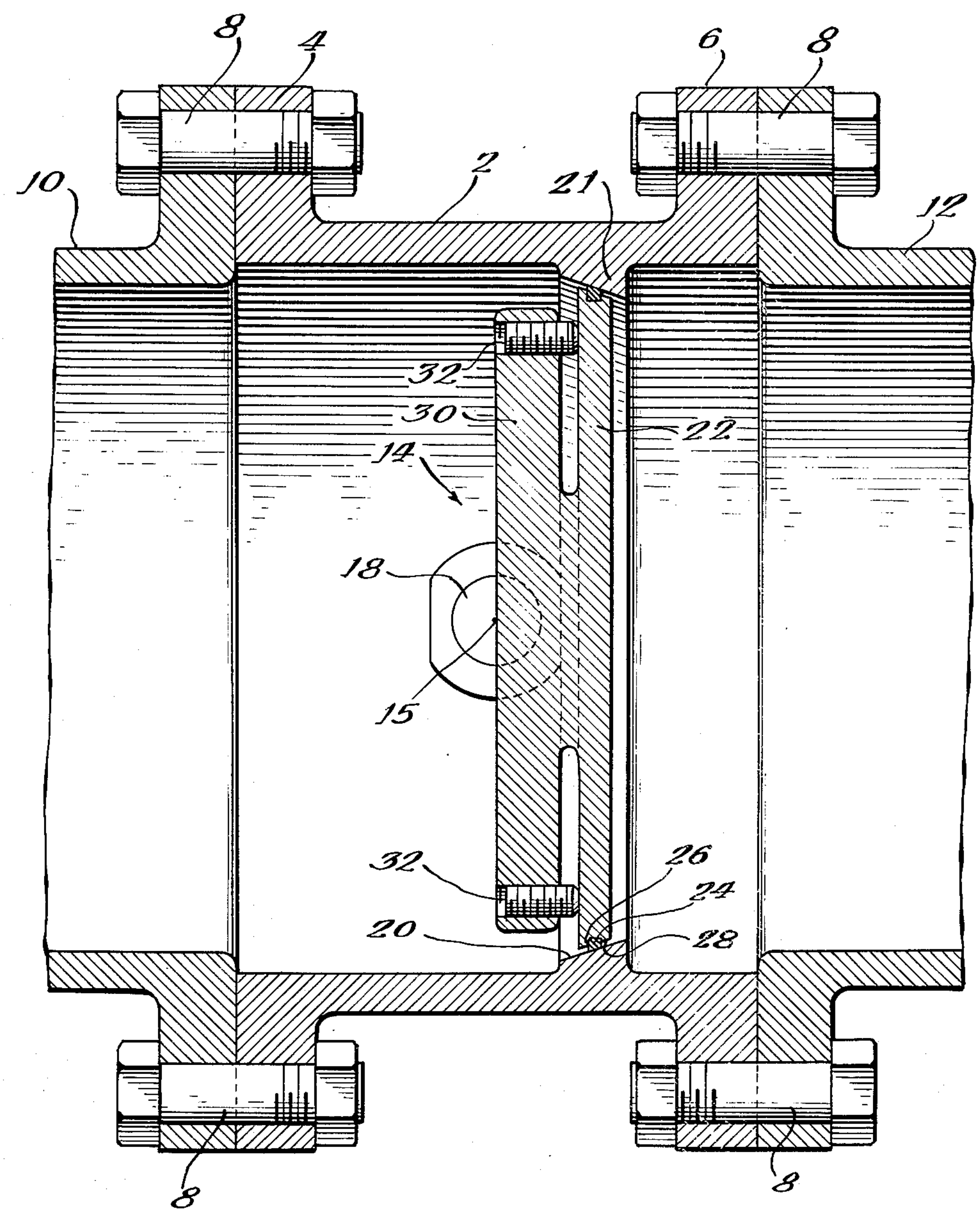

Further objects, features and advantages of the present invention will be apparent from the following description of a preferred embodiment illustrated in the accompanying drawings, in which:

FIGURE 1 is an elevational view of a butterfly valve in closed position embodying the invention; and FIGURE 2 is a central longitudinal sectional view taken through the valve normal to the valve drive shaft and taken substantially on line 2—2 of FIGURE 1.

The present invention generally involves a butterfly valve and is illustrated in a form including a valve housing 2 provided with flanges 4 and 6, one at each end of the housing having bolt openings therein so that the valve may be installed by the use of bolts 8 in mating flanged pipe such as 10 and 12. The valve housing may be made with any desirable formed or shaped ends to mate with desired pipe, nipples or other equipment. The body of the valve preferably is formed of metal, the illustrated embodiment being an aluminum alloy. The valve body may be formed of cast iron or other metals and materials economical and suitable for use in the particular service for which the valve is intended.

The valve housing 2 has a longitudinal centerline about which is formed a generally circular cylindrical passage by the hollow housing. A valve seating surface 20 in the valve housing is part of the surface of a cone having its apex on the valve centerline at a position spaced to the right of the valve as shown in FIG. 2. In the valve illustrated, the surface 20 is the inner surface of a circular uninterrupted inwardly extending ring of metal 21 integrally formed with the wall of the valve housing 2. The inner surface generally is smooth, and machined accurately about the valve centerline.

A closure, designated generally at 14, is pivotally mounted in housing 2 on an axis 15 (FIG. 2) normal to the valve centerline and spaced to one side of the valve seating surface 20 so that the surface faces the axis. The closure 14 is rotatably mounted on stub shafts 16 and 18 for movement through approximately 90° between valve open and valve closed positions. The stub shafts 16 and 18 are appropriately supported in bearings 17 and 19 (FIG. 1) in the housing generally arranged so that the shaft centerline or axis extends diametrically of the housing for supporting the disc. The disc remains in the flow path through the valve whether closed or opened and is turned either across the valve housing to close the valve or aligned with the flow through the valve to open the same. In the present instance, the line between stub shafts is offset with relation to the valve closure itself so that the shaft does not pierce or intersect the valve seat 20 or the circle of closure between the disc and valve housing. An operator mechanism, shown generally at 23, is provided for opening and closing the valve and may be a gear box 25 and hand wheel 27 or a power actuated unit of known construction.

The closure 14 is a one-piece metallic member having a flexible disc shaped portion 22 extending across the valve housing 2 with a periphery in sealing contact with the valve seating surface 20 when the closure 14 is moved about its axis into valve closing position illustrated in the drawings. As shown in the preferred embodiment, a continuous sealing ring 24 of resilient material is secured in a peripheral groove 26 in the outer edge 28 of the disc portion 22 for engagement with the valve seating surface 20. Sealing ring 24 forms a liquid tight seal with the valve seating surface 20 when the closure 14 is in valve closing position. The material of the sealing ring may be a synthetic plastic bonded in the groove 26 by use of resin adhesives and is generally chosen to satisfactorily withstand the temperature and pressure conditions in which the valve will be used as well as to be inert to the liquid or gaseous environment of use. By way of example, a ring 24 of "Viton A" bonded in the groove with an epoxy resin may be used with an aluminum alloy valve in high vacuum service.

The closure 14 has a rigid plate-like portion 30 substantially coextensive with and parallel to the flexible disc portion 22. The plate-like portion 30 carries a plurality of circumferentially spaced thrust screws 32 near its outer edge. The thrust screws 32 are adjustably threaded in the portion 30 to apply a desired force to the flexible disc portion 22 to flex at least the peripheral portion of the disc toward the frusto-conically shaped valve seating surface 20 when the closure is in closed position.

The valve can be properly adjusted so no leakage will occur, and yet, the adjustment may be regulated so that the pressure on the sealing ring 24 will not be excessive and injure the sealing ring or hinder turning of the closure 14. Should the sealing ring wear during use over an extended period of time, the effectiveness of the valve is not reduced because leakage may be prevented by further flexing the disc portion 22 further toward the valve seating surface 20.

As shown in the disclosed embodiment, the plate-like portion 30 and the flexible disc shaped portion 22 are integral, cast of the same material such as aluminum, or the like. In this instance, the plate portion is somewhat thicker than the disc portion so that the plate portion will not bend when the thrust screws are turned into engagement with the disc portion to flex it to a desired position. It is understood that the disc portions may be cast as separate pieces of different materials and secured together by suitable means. The mounting of the closure on the stub shaft axis provides a movement of the sealing ring 24 toward and away from the frusto-conical seating surface as contrasted with a movement across the surface. The axis 15 is removed sufficiently longitudinally from the plane of the surface 20 that further movement in a closing direction from the position illustrated in the drawings would force the ring 24 more tightly against the surface 20. Upon opening movement, the ring 24 is in effect lifted out of contact with the seat surface immediately reducing the pressure of the resilient material against the seat surface. Such action prolongs the life and efficiency of the resilient sealing ring.

While an illustrative embodiment of the invention is shown in the drawings and described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

I claim:

1. A butterfly valve comprising: a valve housing having a generally cylindrical cavity providing a fluid passage through the housing; a frusto-conical surface formed in said housing providing a valve seat; a closure member mounted in said housing having a flexible disc portion extending across said cylindrical cavity in the plane of said valve seat when said disc is in valve closing position; said disc portion being mounted in said housing for sweeping movement generally through 90° away from said valve seat to open the valve; a ring of resilient material mounted about the periphery of said disc portion for cooperating with said valve seat surface when said disc portion is in valve closing position; a rigid portion on said closure member and spaced from said closure disc portion; and adjustable means carried by said rigid portion and engaging the flexible disc portion for flexing said flexible disc portion toward said frusto-conical valve seat surface into a fixed, immovable position relative to the rigid portion such that the disc may carry the resilient ring into repeated sealing contact with the valve seat.

2. A butterfly valve comprising: a valve housing having a generally circular cylindrical cavity providing a fluid passage through the housing; a frusto-conical valve seat formed within said valve housing; a closure rotatably mounted within said housing; a flexible disc mounted on said closure for sweeping movement generally through 90° away from said valve seat to open the valve; said disc extending across said cylindrical cavity in the plane of said valve seat when said disc is in valve closing position; said disc having a continuous resilient sealing ring about its peripheral edge for engagement with said valve seat when said disc is in valve closing position; a plate mounted on said closure generally coextensive with and parallel to said disc; and a plurality of screw means carried on said plate for applying a force to said disc to flex it toward said frusto-conical valve seat to establish a fluid tight seal between said resilient sealing ring and said frusto-conical valve seat, said screw means holding said disc in an immovable position relative to said plate so that the resilient sealing ring sealingly engages the valve seat with each closing movement of the closure.

3. A butterfly valve comprising: a valve housing having a generally circular cylindrical cavity providing a fluid passage through the housing; a frusto-conical valve seat formed within said valve housing; a rotor rotatably mounted within said housing; a closure member pivotally mounted in the housing for movement approximately 90° between valve open and valve closed positions, said closure having a rigid member secured to a shaft for mounting the closure in said housing and an adjacent disc portion for extending across the valve housing to close the valve, the disc portion carrying a continuous resilient ring for sealing contact with said valve seat; and a plurality of thrust members carried by said rigid member and bearing on said disc portion for adjustably moving the disc member away from the rigid member and toward said valve seat in valve closed position, said disc portion being sufficiently resiliently flexible adjacent said valve seat to bend under influence of said thrust members into an immovable position relative to said rigid member and in sealing relation with the valve seat in such immovable position.

4. A butterfly valve comprising: a valve housing having a generally cylindrical cavity providing a fluid passage through the housing; a frusto-conical surface formed in said housing providing a valve seat; a closure member mounted in said housing having a flexible disc portion extending across said cylindrical cavity in the plane of said valve seat when said disc is in valve closing position; said disc portion being mounted in said housing for sweeping movement generally through 90° away from said valve seat to open the valve, either of said periphery of said disc portion or said frusto-conical surface being provided with a sealing surface for cooperating sealing engagement between said valve seat surface and disc portion when said disc portion is in valve closing position; a rigid portion on said closure member and spaced from said closure disc portion; and adjustable means carried by said rigid portion and engaging the flexible disc portion for flexing said flexible disc portion toward said frusto-conical valve seat surface into a fixed, immovable position relative to the rigid portion such that the sealing engagement between said valve seat surface and said disc portion may be established.

References Cited by the Examiner

UNITED STATES PATENTS

| | | | |
|---|---|---|---|
| 2,809,011 | 10/57 | Davis | 251—175 XR |
| 2,853,267 | 9/58 | Herren et al. | 251—307 XR |
| 2,932,533 | 4/60 | Nichols | 251—188 |
| 2,946,553 | 7/60 | Adam | 251—307 XR |
| 2,980,388 | 4/61 | White | 251—298 XR |
| 3,100,104 | 8/63 | Moore | 251—307 XR |

FOREIGN PATENTS

| | | |
|---|---|---|
| 873,117 | 7/61 | Great Britain. |

ISADOR WEIL, *Primary Examiner.*